(12) United States Patent
Kikinis et al.

(10) Patent No.: US 8,405,349 B2
(45) Date of Patent: Mar. 26, 2013

(54) ENHANCED BATTERY STORAGE AND RECOVERY ENERGY SYSTEMS

(75) Inventors: Dan Kikinis, Saratoga, CA (US); Mordechay Avrutsky, Alfei Menashe (IL)

(73) Assignee: Tigo Energy, Inc., Los Gatos, CA (US)

( * ) Notice: Subject to any disclaimer, the term of this patent is extended or adjusted under 35 U.S.C. 154(b) by 448 days.

(21) Appl. No.: 12/577,698

(22) Filed: Oct. 12, 2009

(65) Prior Publication Data
US 2010/0327807 A1 Dec. 30, 2010

Related U.S. Application Data

(60) Provisional application No. 61/269,652, filed on Jun. 25, 2009.

(51) Int. Cl.
H02J 7/00 (2006.01)
(52) U.S. Cl. ......... 320/116; 320/117; 320/118; 320/119
(58) Field of Classification Search ........... 320/116–122
See application file for complete search history.

(56) References Cited

U.S. PATENT DOCUMENTS

| | | | |
|---|---|---|---|
| 5,235,266 A | 8/1993 | Schaffrin | |
| 5,268,832 A | 12/1993 | Kandatsu | |
| 5,504,415 A * | 4/1996 | Podrazhansky et al. | 320/118 |
| 5,604,430 A | 2/1997 | Decker et al. | |
| 5,631,534 A * | 5/1997 | Lewis | 320/103 |
| 5,644,212 A * | 7/1997 | Takahashi | 320/134 |
| 5,923,158 A | 7/1999 | Kurokami et al. | |
| 6,275,016 B1 | 8/2001 | Ivanov | |
| 6,448,489 B2 | 9/2002 | Kimura et al. | |
| 6,650,031 B1 | 11/2003 | Goldack | |
| 6,844,739 B2 | 1/2005 | Kasai et al. | |
| 6,894,911 B2 | 5/2005 | Telefus et al. | |
| 6,984,970 B2 | 1/2006 | Capel | |
| 7,061,214 B2 | 6/2006 | Mayega | |
| 7,248,946 B2 | 7/2007 | Bashaw et al. | |
| 7,256,566 B2 | 8/2007 | Bhavaraju et al. | |
| 7,276,886 B2 | 10/2007 | Kinder | |
| 7,352,154 B2 * | 4/2008 | Cook | 320/116 |
| 7,518,346 B2 | 4/2009 | Prexl | |
| 7,595,616 B2 | 9/2009 | Prexl | |
| 7,605,498 B2 | 10/2009 | Ledenev et al. | |
| 7,719,140 B2 | 5/2010 | Ledenev et al. | |

(Continued)

FOREIGN PATENT DOCUMENTS

| | | |
|---|---|---|
| AU | 2005262278 | 7/2005 |
| DE | 4232356 | 3/1994 |

(Continued)

OTHER PUBLICATIONS

International Patent Application No. PCT/US2010/029924, International Search Report and Written Opinion, Oct. 28, 2010.

(Continued)

*Primary Examiner* — Samuel Berhanu
(74) *Attorney, Agent, or Firm* — Greenberg Traurig LLP

(57) ABSTRACT

Systems and methods are herein disclosed for efficiently and cost-effectively balancing the voltages across batteries and/or cells in an energy storage system. A controller monitors the battery voltages and instructs regulator circuits to balance voltages between any batteries or sets of batteries having imbalanced voltages. Regulator circuits implementing a modified Ćuk converter can be utilized. Regulator circuits can have two capacitive circuits, one inductive circuit, and two switches. Two capacitors, an inductor, and two field effect transistors can be used in each regulator circuit.

20 Claims, 8 Drawing Sheets

U.S. PATENT DOCUMENTS

| | | | |
|---|---|---|---|
| 2005/0057214 A1 | 3/2005 | Matan | |
| 2005/0057215 A1 | 3/2005 | Matan | |
| 2005/0140335 A1* | 6/2005 | Lee et al. | 320/118 |
| 2005/0269988 A1 | 12/2005 | Thrap | |
| 2006/0001406 A1 | 1/2006 | Matan | |
| 2006/0174939 A1 | 8/2006 | Matan | |
| 2006/0185727 A1 | 8/2006 | Matan | |
| 2007/0273351 A1 | 11/2007 | Matan | |
| 2008/0121272 A1 | 5/2008 | Besser et al. | |
| 2008/0122449 A1 | 5/2008 | Besser et al. | |
| 2008/0122518 A1 | 5/2008 | Besser et al. | |
| 2008/0179949 A1 | 7/2008 | Besser et al. | |
| 2008/0191560 A1 | 8/2008 | Besser et al. | |
| 2008/0191675 A1 | 8/2008 | Besser et al. | |
| 2008/0197806 A1 | 8/2008 | Mathias et al. | |
| 2008/0303503 A1 | 12/2008 | Wolfs | |

FOREIGN PATENT DOCUMENTS

| | | |
|---|---|---|
| DE | 19961705 | 7/2001 |
| EP | 1388774 | 2/2004 |
| EP | 1603212 | 12/2005 |
| ES | 2249147 | 3/2006 |
| KR | 100468127 | 1/2005 |
| WO | 03012569 | 2/2003 |

OTHER PUBLICATIONS

Alonso, R. et al., "A New Distributed Converter Interface for PV Panels," 20th European Photovoltaic Solar Energy Conference, Barcelona, Spain, pp. 2288-2291, Jun. 6-10, 2005.

Alonso, R. et al., "Experimental Results of Intelligent PV Module for Grid-Connected PV Systems," 21st European Photovoltaic Solar Energy Conference, Dresden, Germany, pp. 2297-2300, Sep. 4-8, 2006.

Basso, Tim, "IEEE Standard for lnterrconnecting Distributed Resources With the Electric Power System," IEEE PES Meeting, Jun. 9, 2004.

Boostbuck.com, "The Four Boostbuck Topologies," located at http://www.boostbuck.com/TheFourTopologies.html, 2003.

Enslin, Johan H.R., et al., "Integrated Photovoltaic Maximum Power Point Tracking Converter," IEEE Transactions on Industrial Electronices, vol. 44, No. 6, pp. 769-773, Dec. 1997.

Gautam, Nalin K. et al., "An Efficient Algorithm to Simulate the Electrical Performance of Solar Photovoltaic Arrays," Energy, vol. 27, No. 4, pp. 347-361, 2002.

Linares, Leonor et al., "Improved Energy Capture in Series String Photovoltaics via Smart Distributed Power Electronics," 24th Annual IEEE Applied Power Electronics Conference and Exposition, pp. 904-910, Feb. 15, 2009.

Nordmann, T. et al., "Performance of PV Systems Under Real Conditions," European Workshop on Life Cycle Analysis and Recycling of Solar Modules, The "Waste" Challenge, Brussels, Belgium, Mar. 18-19, 2004.

Roman, Eduardo, et al., "Intelligent PV Module for Grid-Connectred PV Systems," IEEE Transactions on Industrial Electronics, vol. 53, No. 4, pp. 1066-1073, Aug. 2006.

Walker, Jeffrey R. et al., "Cascaded DC-DC Converter Connection of Photovoltaic Modules," IEEE Transactions on Power Electronics, vol. 19, No. 4, pp. 1130-1139, Jul. 2004.

Palma, L. et al., "A Modular Fuel Cell, Modular DC-DC Converter Concept for High Performance and Enhanced Reliability," 38th IEEE Power Electronics Specialists Conference (PESC'07), pp. 2633-2638, Jun. 17, 2007.

Quaschning, V. et al., "Cost Effectiveness of Shadow Tolerant Photovoltaic Systems," Euronsun 96, pp. 819-824, Sep. 16, 1996.

Uriarte, S. et al., "Energy Integrated Management System for PV Applications," 20th European Photovoltaic Solar Energy Conference, Jun. 6, 2005.

Walker, G. R. et al., "Cascaded DC-DC Converter Connection of Photovoltaic Modules," 33rd IEEE Power Electronics Specialists Conference (PESC'02), vol. 1, pp. 24-29, 2002.

* cited by examiner

ENHANCED BATTERY STORAGE AND RECOVERY ENERGY SYSTEMS

CROSS-REFERENCE TO RELATED APPLICATIONS

The present application claims the benefit of Provisional U.S. Patent Application Ser. No. 61/269,652, filed Jun. 25, 2009 and entitled "Enhanced Battery Storage and Recovery Energy Systems," the disclosure of which is hereby incorporated by reference.

FIELD OF THE TECHNOLOGY

At least some embodiments of the disclosure relate to energy storage systems in general, and more particularly but not limited to, enhancing the efficiency and number of batteries in a rechargeable energy storage system.

BACKGROUND

Rechargeable energy storage systems having a large number of batteries that can charge and discharge with great efficiency may become increasingly important in the coming years. For instance electric and hybrid cars may benefit from larger energy storage systems and efficient charging and discharging. To supplement wind and solar power generation when there are lulls in the wind or diminished sunlight, large and efficient energy storage systems will be needed in homes and as part of the power grid. Even today's rechargeable laptop computers and cell phones can benefit from more efficient charging and recharging. All of these energy storage systems can operate more effectively if the voltage between batteries is balanced. Current systems for balancing voltages are inefficient and these inefficiencies typically only get worse as the number of batteries increases (larger energy storage systems).

A battery is a combination of one or more electrochemical cells connected in series. Each cell produces a voltage, and when connected in series, a stack of cells (battery) produces a voltage equal to the sum of the cells comprising the battery. Each battery thus produces a voltage, and when connected in series, an energy storage system (comprising one or more batteries connected in series) produces a voltage equal to the sum of the batteries comprising the energy storage system. Voltage imbalances between batteries decrease system efficiency and limit the number of batteries that can be connected in series. Importantly, voltage imbalances may become harder to mitigate as the number of batteries connected in series increases.

At the same time, the number and importance of applications requiring large rechargeable energy storage systems are growing. For instance, homes relying to a large extent or exclusively on wind and/or solar power require large energy storage systems in order to supplement the wind and/or solar power when there is low wind speed or a lack of sunlight. The same problem threatens future power grids since they too will rely largely on wind and solar power. Thus, large energy storage systems are a key to enabling renewable energy to power homes and power grids. Many other applications will also benefit from or require large rechargeable energy storage systems.

SUMMARY OF THE DESCRIPTION

Systems and methods in accordance with the present invention are described herein. Some embodiments are summarized in this section.

In one of many embodiments of the present invention, apparatuses include an energy storage system. The energy storage system comprises two or more batteries connected in series. The two or more batteries form two sets of batteries wherein each set of batteries can comprise one or more batteries. The energy storage system comprises a regulator circuit configured to balance voltages across the two sets of the batteries. The regulator circuit may comprise at least one switchable connection and at least one energy storage unit. The at least one switchable connection may connect the at least one energy storage unit to the two sets of batteries. The energy storage system comprises a controller connected to the regulator circuit. The controller is configured to monitor voltages across the two sets of the batteries. The controller is configured to identify voltage imbalances between the two sets of the batteries. The controller is configured to adjust the regulator circuit so that the voltage imbalances between the two sets of the batteries are minimized.

In another embodiment of the present invention, a method of operating an energy storage system includes monitoring a first voltage across a first set of batteries. The method also includes monitoring a second voltage across a second set of batteries. The method also includes determining if a difference between the first voltage and the second voltage exceeds a voltage imbalance threshold. The method also includes instructing a regulator circuit, associated with the first set of batteries and the second set of batteries, to balance the first voltage and the second voltage. The regulator circuit accomplishes this balancing by storing bypass energy in an energy storage unit. The stored bypass energy is then distributed to one of the sets of batteries.

In another embodiment of the present invention, apparatuses include an energy storage system. The energy storage system comprises a first set of batteries having a first voltage. The energy storage system comprises a second set of batteries having a second voltage. The first and second sets of batteries are connected in series. The energy storage system comprises a regulator circuit. The regulator circuit is configured to balance the first voltage and the second voltage. The regulator circuit comprises an inductive circuit, a first switch, and a second switch. The energy storage system includes a controller connected to the regulator circuit. The controller is configured to monitor the first voltage and the second voltage. The controller is configured to identify a voltage imbalance between the first voltage and the second voltage. The controller is configured to adjust the first switch and the second switch to minimize the voltage imbalance between the first voltage and the second voltage.

Other embodiments and features of the present invention will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

The present disclosure describes an energy storage system and methods for storing energy, wherein voltage variations between batteries and/or cells are efficiently (for example, losses as low as 1-3% approximately) minimized at relatively low cost. This may be accomplished via using one or more regulator circuits to balance voltages between sets of batteries. In an embodiment, the one or more regulator circuits may comprise at least one energy storage unit and at least one switchable connection. In an embodiment, the one or more regulator circuits may be modified Ćuk converters. In an embodiment, the one or more regulator circuits may comprise at least a low impedance inductor, at least two low impedance capacitors, and at least a pair of cycling transistors to balance voltages across sets of cells while converting only minimal energy into heat (low losses).

Figure 1A:
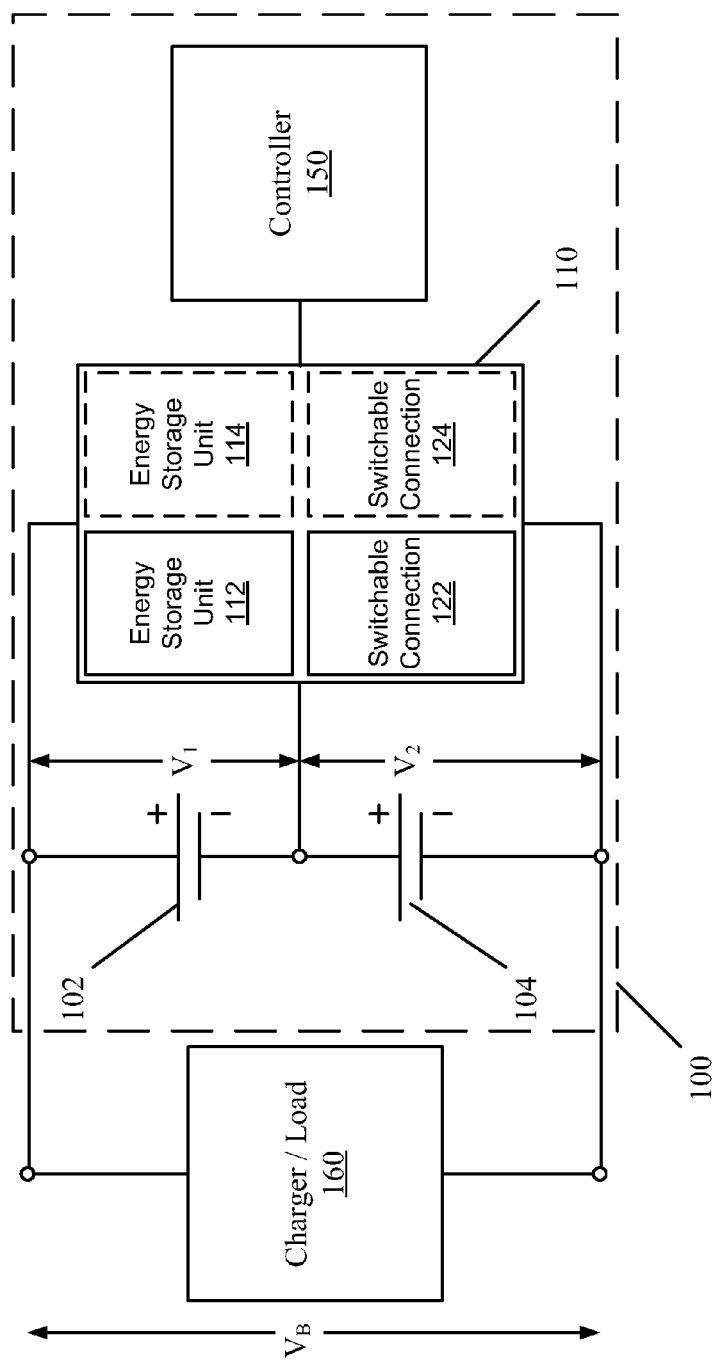
FIG. 1a illustrates an embodiment of an energy storage system having a plurality of batteries, a plurality of regulator circuits, and a controller.

FIG. 1a illustrates an embodiment of an energy storage system having a plurality of batteries, a plurality of regulator circuits, and a controller. For the purposes of this disclosure, a battery is an energy storage device having one or more electrochemical cells (or cells) configured to store energy. A battery can have positive and negative terminals. The positive and negative terminals of two batteries can be connected via a conductive medium to form part of an energy storage system. Any number of batteries can be connected in this fashion. As more batteries are added to the energy storage system, the energy storage system voltage output increases and is equal to the sum of the voltages across each of the batteries. For instance, in FIG. 1a, the battery voltage $V_B$ is the sum of the first voltage and the second voltage ($V_B = V_1 + V_2$).

Each battery comprises one or more cells. The number of cells in a battery may be limited by voltage imbalances between cells. In order to avoid the expense and complexity of balancing cells, the number of cells in a battery may be limited to such a number that cell voltage balancing is not necessary. The number of cells that can be connected in series without the need for cell voltage balancing varies from one battery type to another. For instance, cell regulation is more important in Li and Li-Ion batteries, where voltage imbalances may not just lead to inefficiency but also to fire and explosion. For the purposes of this disclosure, the number of cells in a battery may be assumed to be the maximum number of cells for a given battery type that do not require cell voltage balancing.

The energy storage system 100 comprises two or more batteries 102, 104 connected in series to form a portion of the energy storage system 100. The batteries are rechargeable and can either be charged by a charger/load device 160, or can discharge energy into a charger/load device 160. The charger/load device 160 can comprise one or more devices (e.g., multiple power sources or multiple resistive loads). A first voltage $V_1$ across the first battery 102, and a second voltage $V_2$ across the second battery 104 may be monitored. In an embodiment, a controller 150 monitors $V_1$ and $V_2$. In the illustrated embodiment, the controller 150 monitors the first and second voltages $V_1$, $V_2$ via connection to a regulator circuit 110. In another embodiment (not illustrated), the controller can directly monitor the voltages $V_1$, $V_2$ across the first and second batteries 102, 104. For instance, the controller 150 may have connections to terminals of the batteries 102, 104 whereby the voltages $V_1$, $V_2$ across the batteries 102, 104 can be measured.

If the first voltage $V_1$ across the first battery 102 varies significantly from the second voltage $V_2$ across the second battery 104, then the regulator circuit 110 may balance or minimize the voltages $V_1$, $V_2$ such that the voltages $V_1$, $V_2$ are equal. In an embodiment, balancing the voltages means adjusting the voltages $V_1$, $V_2$ such that they are within a voltage imbalance threshold $V_T$ of each other. For instance, if the voltage imbalance threshold is 0.2V, balancing the voltages means that two voltages will be adjusted until they are within 0.2V of each other. In an embodiment, balancing the voltages means adjusting one of the two voltages $V_1$, $V_2$ until it is within the voltage imbalance threshold $V_T$ of the other voltage. For instance, if the voltage imbalance threshold is 0.3V and the first voltage $V_1$ is 100.0V, and the second voltage $V_2$ is 99.3V, then balancing the voltages may mean adjusting $V_2$ until it is greater than 99.7V. Alternatively, the larger voltage could be decreased until it is within $V_T$ of the smaller voltage.

Given more than two batteries in series, more than one regulator circuit 110 may be used. Furthermore, when more than two batteries are used, the regulator circuits 110 may balance voltages across sets of batteries rather than just across individual batteries. For instance, given four batteries A, B, C, and D, a regulator circuit may balance the voltages across the following two sets of batteries: (1) A and B; and (2) C and D.

In an embodiment, the regulator circuit 110 may comprise one or more energy storage units 112, 114 and one or more switchable connections 122, 124. As indicated in FIG. 1a, the second energy storage unit 114 and the second switchable connection 124, are optional, as are any third, fourth, or fifth energy storage units or switchable connections (not illustrated).

The switchable connection 122 may comprise one or more switches. A switch may be a transistor. In an embodiment, the one or more switchable connections 122, 124 are configured to allow energy (voltage and/or current) to bypass the second battery 104. The one or more switchable connections are further configured to route the bypass energy to the one or more energy storage units 112, 114. For the purposes of this disclosure, "bypass energy" is current and/or voltage that, rather than being provided to or discharged from the first or second sets of batteries, is routed to one or more energy storage units. From the energy storage units, the stored bypass energy can be distributed to one of the sets of batteries.

In an embodiment, an energy storage unit may comprise an inductive circuit. In an embodiment, an inductive circuit may comprise an inductor. Thus, bypass energy may be stored in an inductive circuit (e.g., inductor). In an embodiment, the at least one energy storage unit 112, 114 comprises at least one capacitive circuit. The one or more capacitive circuits may be capacitors. The capacitors may filter voltage and/or current spikes (e.g., ripple currents). Capacitors may also store bypass energy.

The one or more switchable connections 122, 124 are further configured to route bypass energy that is stored in the one or more energy storage units 112, 114 to either the first or second battery 102, 104. In an embodiment, a switchable connection 122, 124 may be a switch (e.g., transistor). In an embodiment, the first switchable connection 122 can comprise two switches: one configured to store bypass energy in the energy storage unit 112, and one configured to distribute the stored bypass energy to either of the batteries 102, 104. Given an embodiment having two switches, one of the switches may be a transistor and one of the switches may be a diode.

For the purposes of this disclosure, a "set of batteries" means one or more batteries. In an embodiment, a set of batteries can include a single battery. Thus, for example, when reference is made to balancing two sets of batteries having a first voltage $V_1$ and a second voltage $V_2$, respectively, where each set of batteries comprises a single battery, what is meant is that the voltages across the two individual batteries are being balanced (e.g., $V_1 = V_2$).

In an embodiment, a set of batteries can include two or more batteries. Thus, for example, when reference is made to balancing two sets of batteries, where each set of batteries comprises two batteries, (assume a voltage across each of the four batteries as follows: $V_1, V_2, V_3$, and $V_4$) what is meant is that the voltage across one of the two pairs of batteries is being balanced with the voltage across the other pair of batteries (e.g., $V_1 + V_2 = V_3 + V_4$).

In an embodiment, a set of batteries can include one battery, or two or more batteries. Thus, for example, when reference is made to balancing two sets of batteries, where a first set comprises one battery, A, and the second set comprises three batteries, B, C, and D, what is meant is that the voltage across battery A is being balanced relative to the average voltage across batteries B, C, and D (e.g., $V_A = (V_B + V_C + V_D)/3$). As a further example of this third embodiment, when reference is made to balancing two sets of batteries, where a first set comprises two batteries A and B, and the second set comprises three batteries C, D, and E, what is meant is that the average voltage across batteries A and B is being balanced relative to the average voltage across batteries C, D, and E (e.g., $(V_A + V_B)/2 = (V_C + V_D + V_E)/3$). The details of such balancing are discussed later in this disclosure.

In an embodiment, sets of batteries can overlap. For instance, given three batteries, A, B, and C, a first set of batteries may comprise batteries A and B. A second set of batteries may comprise batteries B and C. Hence, the first and second sets of batteries both comprise battery B. While some embodiments of the energy storage system 100 will involve balancing the voltages of individual batteries relative to other individual batteries, often balancing will take place between sets of batteries.

For the purposes of this disclosure, a "terminal" is a point on an electrical component where an electrical connection can be made. Inductors, capacitors, resistors, transistors, and batteries generally include at least a first and second terminal. Switches and transistors may additionally have a gate terminal used to control switching. With reference to the figures, the first terminal is that which is closest to the top of a figure for components that are shown as vertically-oriented, and closest to the right of a figure for components that are shown as horizontally-oriented.

For the purposes of this disclosure, a "voltage imbalance" means the circumstance where two or more battery voltages are not equal or differ by at least a voltage imbalance threshold $V_T$. Voltage imbalance may cause a battery to charge or discharge inefficiently or worse can cause overcharging and potentially explosion or fire. Voltage imbalance may depend on the type of battery. For instance, many batteries, like Lead Acid, Nickel Cadmium, and Nickel-Metal Hydride, have greater tolerance for voltage imbalance than do Li or Li-Ion batteries. Moreover, the risk of explosion or fire may be greater with Li-Ion batteries. Thus, it may be desirable to seek less voltage imbalance in Li and Li-Ion batteries than other battery types. Throughout this disclosure reference will be made to balancing and minimizing voltage imbalances and to convergence of voltages. These terms and phrases are interchangeable. A voltage imbalance may also be referred to as a variation in voltage.

For the purposes of this disclosure, "minimized" means any convergence of two voltages. In an embodiment, minimizing voltage imbalances means adjusting voltages such that they converge on an average. For instance, the two voltages 50V and 100V may be adjusted so that they converge to 75V. In another embodiment, minimizing voltages means adjusting voltages such that they converge on a voltage that is not an average. For instance, the two voltages 50V and 100V may be adjusted so that they converge on 100V. As another example, the two voltages 50V and 100V may be adjusted so that they converge on 90V.

One should further understand that the systems herein disclosed can also be implemented to balance voltages between cells or between cells as well as between batteries. For instance, see FIG. 1b.

Figure 1B:
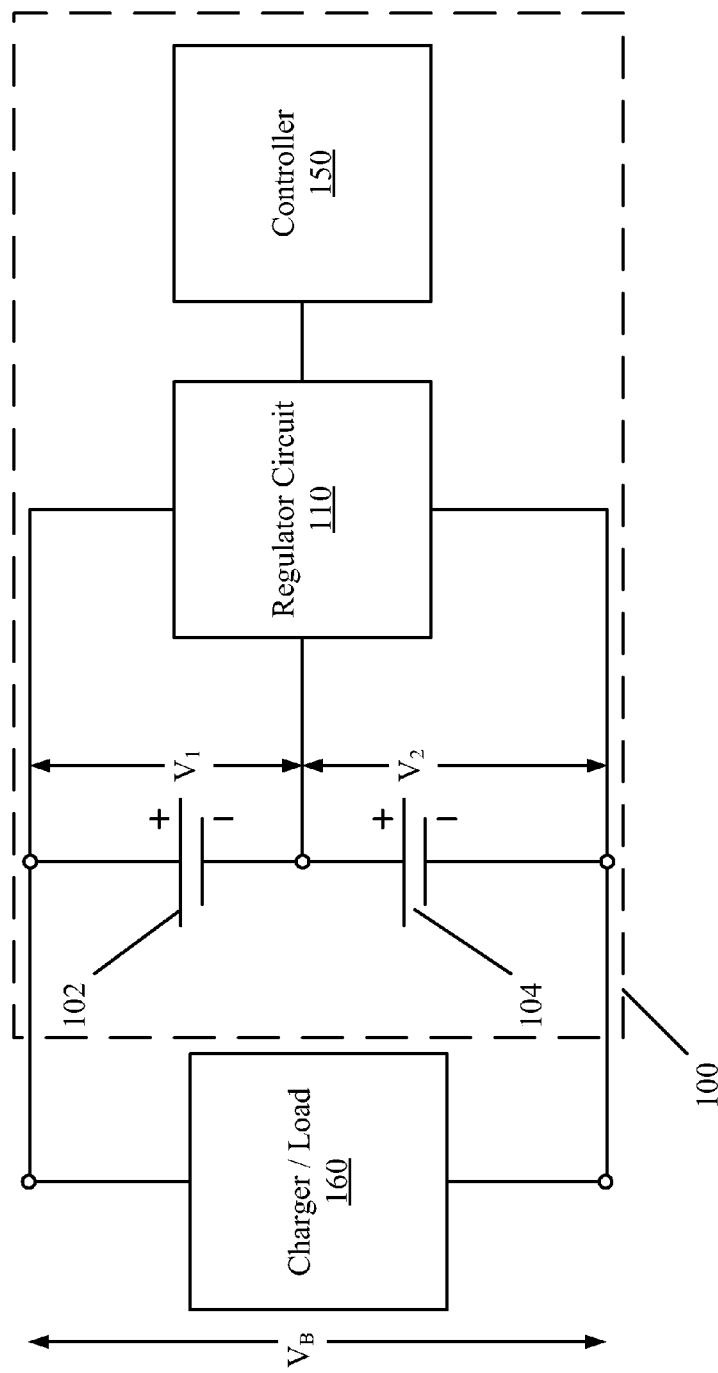
FIG. 1b illustrates an embodiment of an energy storage system having a plurality of batteries, a plurality of regulator circuits, and a controller.

FIG. 1b illustrates an embodiment of an energy storage system having a plurality of cells, a plurality of regulator circuits, and a controller.

The energy storage system 100 comprises two or more cells 102, 104 connected in series to form a battery. The battery is rechargeable and can either be charged by a charger/load device 160, or can discharge energy into a charger/load device 160. The charger/load device 160 can comprise one or more devices (e.g., multiple power sources or multiple resistive loads). A first voltage $V_1$ across the first cell 102, and a second voltage $V_2$ across the second cell 104 may be monitored. In an embodiment, a controller 150 monitors $V_1$ and $V_2$. In the illustrated embodiment, the controller 150 monitors the first and second voltages $V_1, V_2$ via connection to a regulator circuit 110. In another embodiment (not illustrated), the controller can directly monitor the voltages $V_1, V_2$ across the first and second cells 102, 104. For instance, the controller 150 may have connections to terminals of the cells 102, 104 whereby the voltages $V_1, V_2$ across the cells 102, 104 can be measured.

If the first voltage $V_1$ across the first cell 102 varies significantly from the second voltage $V_2$ across the second cell 104, then the regulator circuit 110 may balance or minimize the voltages $V_1, V_2$ such that the voltages $V_1, V_2$ are equal. In an embodiment, balancing the voltages means adjusting the voltages $V_1, V_2$ such that they are within a voltage imbalance threshold $V_T$ of each other. For instance, if the voltage imbalance threshold is 0.2V, balancing the voltages means that two voltages will be adjusted until they are within 0.2V of each other. In an embodiment, balancing the voltages means adjusting one of the two voltages $V_1, V_2$ until it is within the voltage imbalance threshold $V_T$ of the other voltage. For instance, if the voltage imbalance threshold is 0.3V and the first voltage $V_1$ is 100.0V, and the second voltage $V_2$ is 99.3V, then balancing the voltages may mean adjusting $V_2$ until it is greater than 99.7V. Alternatively, the larger voltage could be decreased until it is within $V_T$ of the smaller voltage.

For batteries comprising more than two cells, more than one regulator circuit 110 may be used. Furthermore, when more than two cells are used, the regulator circuits 110 may balance voltages across sets of cells rather than just across individual cells. For instance, given four cells A, B, C, and D, a regulator circuit may balance the voltages across the following two sets of cells: (1) A and B; and (2) C and D.

For the purposes of this disclosure, a "set of cells" means one or more cells. In an embodiment, a set of cells can include a single cell. Thus, for example, when reference is made to balancing two sets of cells having a first voltage $V_1$ and a second voltage $V_2$, respectively, where each set of cells comprises a single cell, what is meant is that the voltages across the two individual cells are being balanced (e.g., $V_1=V_2$).

In an embodiment, a set of cells can include two or more cells. Thus, for example, when reference is made to balancing two sets of cells, where each set of cells comprises two cells, (assume a voltage across each of the four cells as follows: $V_1$, $V_2$, $V_3$, and $V_4$) what is meant is that the voltage across one of the two pairs of cells is being balanced with the voltage across the other pair of cells (e.g., $V_1+V_2=V_3+V_4$).

In an embodiment, a set of cells can include one cell, or two or more cells. Thus, for example, when reference is made to balancing two sets of cells, where a first set comprises one cell, A, and the second set comprises three cells, B, C, and D, what is meant is that the voltage across cell A is being balanced relative to the average voltage across cells B, C, and D (e.g., $V_A=(V_B+V_C+V_D)/3$). As a further example of this third embodiment, when reference is made to balancing two sets of cells, where a first set comprises two cells A and B, and the second set comprises three cells C, D, and E, what is meant is that the average voltage across cells A and B is being balanced relative to the average voltage across cells C, D, and E (e.g., $(V_A+V_B)/2=(V_C+V_D+V_E)/3$). The details of such balancing are discussed later in this disclosure.

In an embodiment, sets of cells can overlap. For instance, given three cells, A, B, and C, a first set of cells may comprise cells A and B. A second set of cells may comprise cells B and C. Hence, the first and second sets of cells both comprise cell B. While some embodiments of the energy storage system 100 will involve balancing the voltages of individual cells relative to other individual cells, often balancing will take place between sets of cells.

Figure 2:
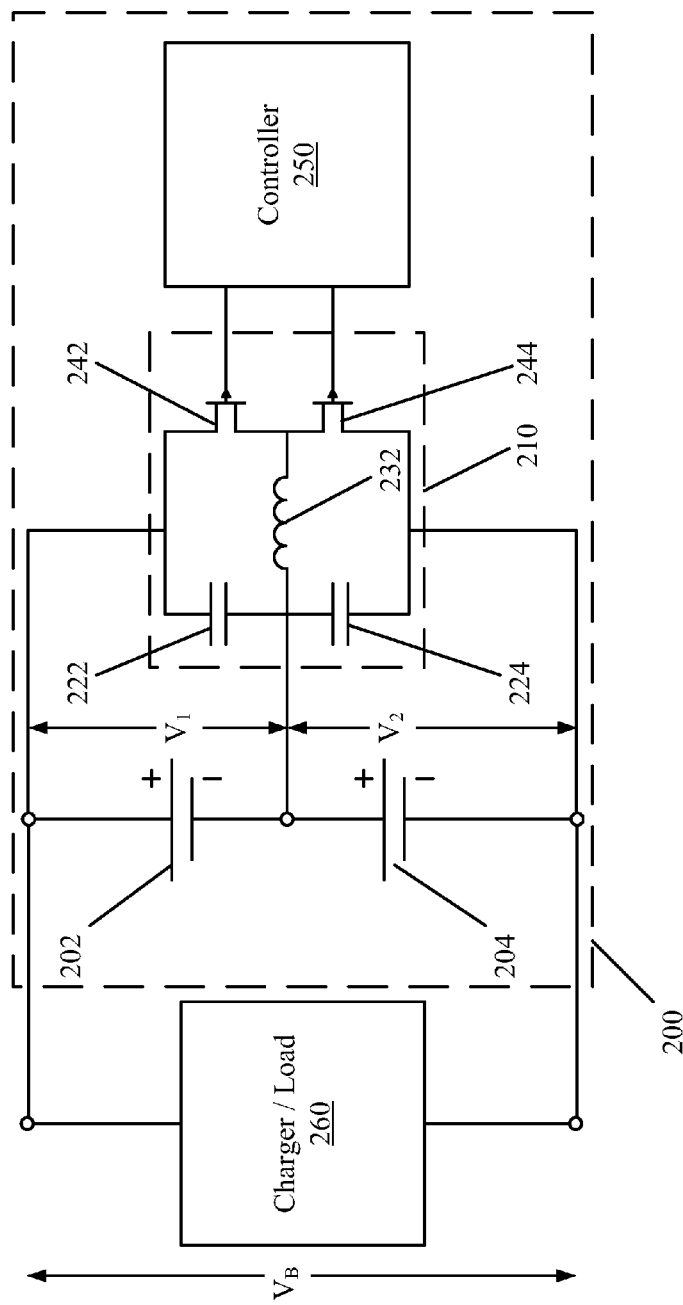
FIG. 2 illustrates an embodiment of a regulator circuit.

For the purposes of this disclosure, a "regulator circuit" means a circuit configured to minimize a voltage imbalance between two sets of cells or batteries. In one embodiment, the regulator circuit 110 may be a modified Ćuk converter as illustrated in FIG. 2. In the illustrated embodiment, the regulator circuit 210 has two capacitive circuits 222, 224 (optional). The first capacitive circuit 222 may be connected in parallel with the first battery 202. The second capacitive circuit 224 may be connected in parallel with the second battery 204. Both of the first and second capacitive circuits 222, 224 have a first and second terminal. The first terminal of the first capacitive circuit 222 may be connected to the first terminal of the first battery 202. The second terminal of the first capacitive circuit 222 may be connected to the second terminal of the first battery 202. The first terminal of the second capacitive circuit 224 may be connected to the first terminal of the second battery 204. The second terminal of the second capacitive circuit 224 may be connected to the second terminal of the second battery 204.

For the purposes of this disclosure, a "capacitive circuit" means a combination of interconnected electrical components, or a single component, capable of storing and discharging charge (or energy) and/or filtering alternating current (AC) signals. The energy stored in the capacitive circuits 222, 224 can be used to mitigate current/voltage spikes by discharging some of the stored energy. The stored energy can also be used to later supplement batteries having undesired voltages (either by charging or supplementing discharge). Similarly, capacitive circuits 222, 224 are also able to dampen or filter certain frequencies of AC signals such as voltage/current spikes or ripple currents.

In an embodiment, each capacitive circuit 222, 224 comprises a single capacitor. In an embodiment, each capacitive circuit 222, 224 comprises multiple capacitors. In an embodiment, each capacitive circuit 222, 224 comprises multiple capacitors in parallel. In an embodiment, the capacitive circuits 222, 224 comprise a combination of electrolytic and bipolar capacitors. Capacitive circuits 222, 224 may include devices that are not capacitors. For example, other devices such as batteries and gates of certain transistors have similar properties to capacitors, and can thus be used in the capacitive circuit 222, 224.

The regulator circuit 210 also includes an inductive circuit 232, which may be connected to the optional two capacitive circuits 222, 224. The inductive circuit 232 may be connected to the two batteries 202, 204. The inductive circuit 232 is configured to store energy (current and/or voltage). The inductive circuit 232 can be charged by energy provided by either battery 202, 204, or can be charged by bypass energy. Bypass energy is current and/or voltage that is directed around one of the batteries 202, 204. For instance, a duty cycle may be applied to the switches 242, 244 such that during charging energy bypasses the second battery 204 and instead is stored on the inductive circuit 232. Later, the duty cycle can be adjusted to allow the energy stored on the inductive circuit 232 to be distributed to the first battery 202. In another example, during discharge, energy from the second battery 204 may bypass the first battery 202 via an adjustment in the duty cycle of the switches 242, 244. The bypass energy may be stored on the inductive circuit 232. The duty cycle can be later adjusted, and the stored energy can be discharged from the inductive circuit 232 and routed to the charger/load 260 or back to the second battery 204.

For the purposes of this disclosure, an "inductive circuit" means a combination of interconnected electrical components, or a single component, capable of resisting changes in current. In an embodiment, the inductive circuit 232 can comprise one or more inductors. The inductors may use hollow cores or ferrite cores. Given high frequency applications, the inductive loops of the inductors might use litz wire. Since the inductive circuit 232 can reduce or mitigate ripple currents, the inductive circuit 232 can be optimized (e.g., size, composition, structure) for known ripple currents.

In the illustrated embodiment, a second terminal of the inductive circuit 232 connects to the following: (1) the second terminal of the first capacitive circuit 222, (2) the first terminal of the second capacitive circuit 224, (3) the second terminal of the first battery 202, and (3) the first terminal of the second battery 204. In the illustrated embodiment, the inductive circuit 232 is also connected to two switches 242, 244. Each of the switches may have a first and second terminal. The first terminal of the inductive circuit 232 is connected to the second terminal of the first switch 242 and to the first terminal of the second switch 244.

For the purposes of this disclosure, a "switch" means a device for interrupting and/or diverting current passing through a conductor. A switch can be either mechanical or electrical. Basic switches have two states: open (off) or closed (on). However, more complex switches can have open and closed states as well as states for diverting current into other conductors. In an embodiment, a switch is a transistor. There are two major categories of transistors: field-effect transistors (FET), and bipolar junction transistors (BJT). Within each of these categories of transistors are numerous subcategories of transistors. For example, BJT's can be further specified as NPN, PNP, or heterojunction, and FET's can be further specified as metal-oxide semiconductor field-effect transistor (MOSFET) and junction field-effect transistor (JFET). FET's can further be divided into depletion-mode and enhancement-mode FET's. It should be understood, that this brief list of transistors and their subcategories is not exclusive. For the purposes of this disclosure, a transistor used as a switch may be in the on state when in saturation mode and in the off state when in cutoff mode.

In the illustrated embodiment, the switches 242, 244 are also connected to the batteries 202, 204 and the capacitive circuits 222, 224. The first terminal of the first switch 242 is connected to the first terminal of the first battery 202 and to the first terminal of the first capacitive circuit 222. The second terminal of the second switch 244 is connected to the second terminal of the second battery 204 and to the second terminal of the second capacitive circuit 224.

In the illustrated embodiment, the switches 242, 244 are either open or closed. In an embodiment, the switches 242, 244 are periodically opened and closed and the first switch 242 is open when the second switch 244 is closed, and vice versa. The ratio of time that the first switch 242 is closed relative to the time that the second switch 244 is closed is called the duty cycle. When both switches 242, 244 are closed for equivalent periods of time, the duty cycle is 50%. When the first switch 242 is closed continuously, and the second switch 244 is open continuously, the duty cycle is 100%. When the first switch 242 is closed 25% of the time, and the second switch closed 75% of the time, the duty cycle is 25%.

In an embodiment, the controller 250 controls the duty cycle. In other words, the controller 250 determines for how long each switch 242, 244 remains closed. In an embodiment, the switches 242, 244 have a third terminal called a gate terminal. The gate terminal of each switch 242, 244 can be connected to the controller 250. In such an embodiment, the controller 250 controls or drives the switches 242, 244 via the gate terminal of the switches 242, 244.

For the purposes of this disclosure, a "controller" means hardware or software (implemented in hardware) configured to control the regulator circuit 210. In one embodiment, the controller 250 is a small single chip micro controller (SCMC). For example, the controller 250 may be implemented using Application-Specific Integrated Circuit (ASIC) or Field-Programmable Gate Array (FPGA). The controller 250 can even be implemented in discrete, functionally equivalent circuitry, or in other cases a combination of SCMC and discrete circuitry. In an embodiment, the controller 250 controls the regulator circuit 210 via pulse width modulation.

In an embodiment, the controller 250 may be connected to the first battery 202 and the second battery 204. The controller 250 may monitor the first voltage $V_1$ across the first battery 202. The controller 250 may monitor the second voltage across the second battery 204. From monitoring the voltages $V_1$, $V_2$ the controller 250 can determine if a difference between the first and second voltage exceeds the voltage imbalance threshold $V_T$ or identify voltage imbalances between the batteries 202, 204. The voltage imbalance threshold is a preset number that represents the allowable margin of voltage difference between two sets of batteries. For instance, given a first set of batteries operating at a voltage of 100.2V, a second set of batteries operating at a voltage of 100.1V, and a voltage imbalance threshold of 0.2V, the difference between the first and second voltages (0.1V) does not exceed the voltage imbalance threshold. However, if the first voltage increases to 100.4V, then the voltage imbalance threshold is exceeded (i.e., $0.3V > V_T$).

If the voltage imbalance threshold is exceeded, then the controller 250 can instruct the regulator circuit 210 to balance the voltages between the first and second batteries 202, 204. In an embodiment, this involves controlling or driving the switches 242, 244. In an embodiment, this involves adjusting the duty cycle of the switches 242, 244. In this manner, the controller 250 adjusts the switch 242, 244 duty cycle such that the voltage imbalances between the batteries 202, 204 are minimized (the voltages converge). For example, when the voltages across the two batteries 202, 204 that the regulator circuit 210 is attempting to balance are equal, the duty cycle can be set to 50%. When a voltage imbalance exists between the first and second batteries 202, 204, the controller 250 can adjust the duty cycle of the first switch 242 and the second switch 244 to a value other than 50%.

The regulator circuit 210 may have inherent losses (e.g., impedance of the various components and connections). Thus, greater efficiency can be achieved by turning the regulator circuit 210 off when the voltages $V_1$, $V_2$ across the batteries 202, 204 are equal or when the difference between voltages $V_1$, $V_2$ is less than the voltage imbalance threshold $V_T$.

How the controller controls the regulator circuit 210 depends upon whether the batteries 202, 204 are being charged or discharged. Thus, the controller 210 can monitor the direction of current flow in the energy storage system 200 and determine whether the batteries 202, 204 are being charged or discharged.

While the description of FIGS. 1a and 2 are based on an energy storage system 100 with two batteries 102, 104, 202, 204 it should be understood that this description also applies to configurations where there are more than two batteries and/or more than one regulator circuit. For instance, the regulator circuit 110, 210 may balance voltages across two sets of batteries, where each set of batteries has one or more batteries. Examples of such energy storage systems will be discussed with reference to FIGS. 3 and 4. While the embodiment of the regulator circuits 110, 210 illustrated in FIGS. 1a, 1b, 2 have three terminals, it should be understood that the regulator circuit 110, 210 may have more or less than three terminals, and that those terminals may connect to the sets of batteries/cells at different locations than those illustrated in FIGS. 1a, 1b, and 2. While the description of FIG. 1b is based on an energy storage system 100 with two cells 102, 104, it should be understood that this description also applies to configurations where there are more than two cells and/or more than one regulator circuit.

Figure 3:
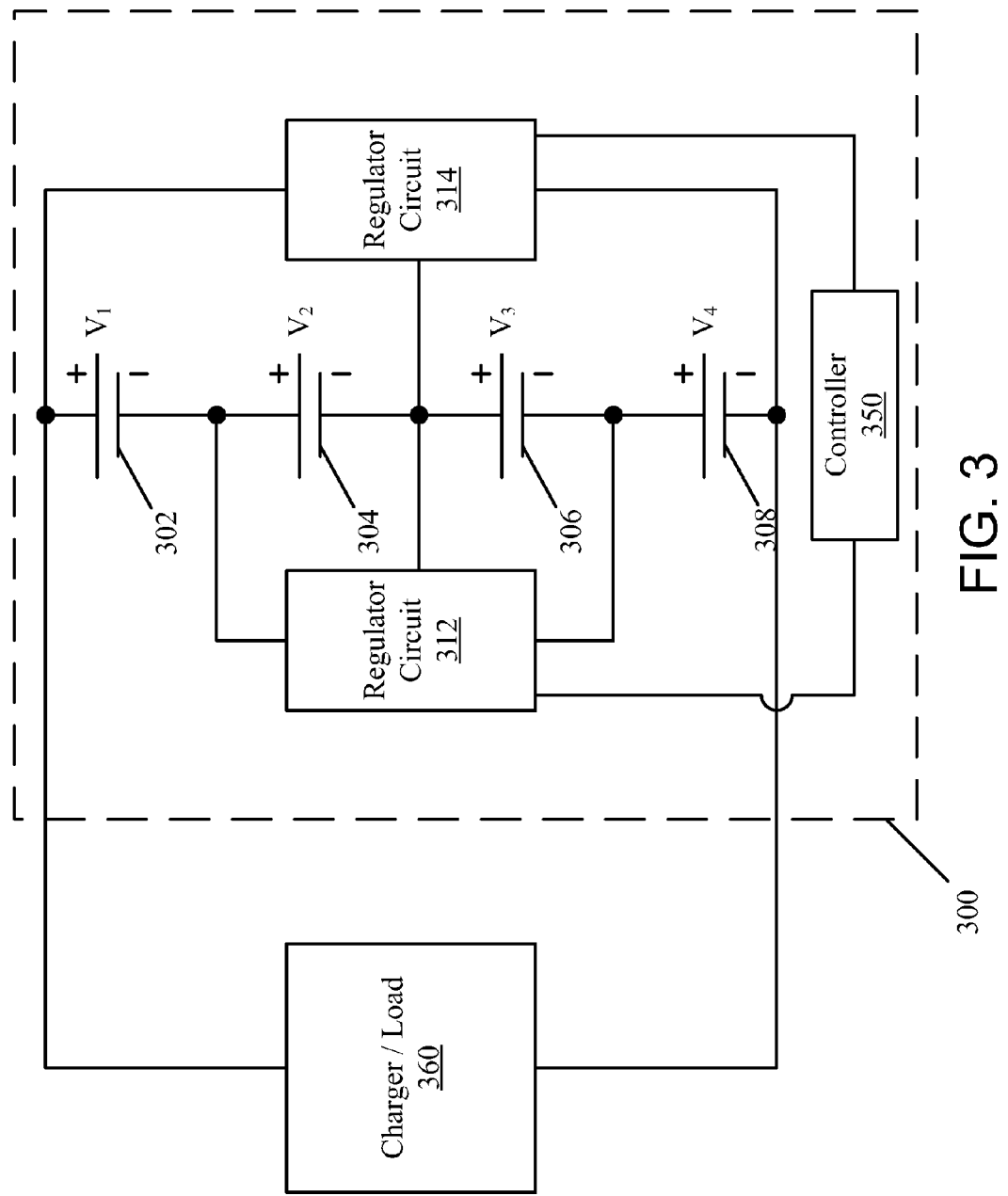
FIG. 3 illustrates an embodiment of an energy storage system having four batteries and two regulator circuits.

FIG. 3 illustrates an embodiment of an energy storage system having four batteries and two regulator circuits. The energy storage system 300 includes four batteries 302, 304, 306, 308. The batteries 302, 304, 306, 308 are connected in series. The energy storage system 300 is series connected to a charger/load 360. The energy storage system 300 includes two regulator circuits 312, 314. In an embodiment, the regulator circuits 312, 314 comprise the capacitive circuits, the inductive circuit, and the switches illustrated in FIG. 2. Each regulator circuit 312, 314 may be configured to balance the voltages across two sets of batteries. In the illustrated embodiment, the first regulator circuit 312 is configured to balance a first voltage $V_2$ across the second battery 304 and a second voltage $V_3$ across the third battery 306. In the illustrated embodiment, the first regulator circuit 312 has three connections: (1) to a second terminal of the first battery 302 and to a first terminal of the second battery 304, (2) to a second terminal of the second battery 304 and to a first terminal of the third battery 306, and (3) to a second terminal of the third battery 306 and to a first terminal of the fourth battery 308.

In the illustrated embodiment, the second regulator circuit 314 is configured to balance two voltages across two sets of batteries. One voltage, $V_{12}$ comprises the sum of the voltage $V_1$ across the first battery 302 and the voltage $V_2$ across the second battery 304. Another voltage, $V_{34}$ comprises the sum of the voltage $V_3$ across the third battery 306 and the voltage $V_4$ across the fourth battery 308. The second regulator circuit 314 thus balances the voltages $V_{12}$ and $V_{34}$ so that $V_{12}=V_{34}$. The balanced voltages can also be written as follows: $V_1+V_2=V_3+V_4$. In the illustrated embodiment, the second regulator circuit 314 has three connections: (1) to a first terminal of the first battery 302; (2) to a second terminal of the second battery 304 and to a first terminal of the third battery 306; and (3) to a second terminal of the fourth battery 308.

Conceptually, balancing the voltages across the batteries 302, 304, 306, 308 occurs as follows. The first regulator circuit 312 balances the voltages across the second battery 304 and the third battery 306. Since $V_2=V_3$, when the second regulator circuit 314 balances the two sets of batteries (302, 304), (306, 308), the voltage across the first battery 302 and the fourth battery 308 must balance ($V_1=V_4$).

The energy storage system 300 may include a controller 350 configured to control the regulator circuits 312, 314. In an embodiment (not illustrated), the controller 350 may monitor the voltages across the batteries 302, 304, 306, 308 via connections to the batteries or to the connections between batteries. In an embodiment, the controller 350 may monitor voltages via the regulator circuits 312, 314. If the voltage imbalance threshold $V_T$ is exceeded, then the controller 350 can instruct the regulator circuits 312, 314 to balance the voltages across the sets of batteries that are imbalanced.

For example, assume that the voltages across the first battery 302, second battery 304, third battery 306, and fourth battery 308 are $V_1$, $V_2$, $V_3$, and $V_4$, respectively. Assume the energy storage system 300 comprises a 400V battery where each battery 302, 304, 306, 308 ideally operates at 100V. However, assume that $V_1=V_2=V_3=100V$, and $V_4=99.8V$. Assume the voltage imbalance threshold $V_T$ is 0.1V. The controller 350 does not observe a voltage imbalance between the two sets of batteries 304, 306 associated with the first regulator circuit 312 since the difference between $V_2$ and $V_3$ is 0V. The controller 350 thus does not change the instructions provided to, or being provided to, the first regulator circuit 312 (if the regulator circuit 312 uses switches, then the duty cycle can be maintained at 50%). On the other hand, the controller 350 observes a voltage imbalance between the two sets of batteries (302, 304), (306, 308) associated with the second regulator circuit 314 since the two voltages across those two sets of batteries (302, 304), (306, 308) is not equal. The first set of batteries 302, 304 has a voltage of 200V ($V_1+V_2=100V+100V=200V$). The second set of batteries 306, 308 has a voltage of 199.8V ($V_3+V_4=100V+99.8V=199.8V$). The difference between these two voltages is 0.2V. Since 0.2V is greater than the voltage imbalance threshold $V_T$ of 0.1V, the controller instructs the second regulator circuit 314 to balance the voltages between the two sets of batteries (302, 304), (306, 308) (if the regulator circuit 312 uses switches, then the duty cycle is altered from 50%). The controller 350 continues to instruct the regulator circuit 314 to balance the voltages if the voltage imbalance falls below the voltage imbalance threshold $V_T$. The controller 350 then instructs the regulator circuit 314 to maintain the balanced voltages (if the regulator circuit 312 uses switches, then the duty cycle may return to 50%). The foregoing values have been used for illustrative purposes only and in no way are intended to limit the scope of this disclosure.

Although FIG. 3 only shows a single connection between the controller and each of the regulator circuits 312, 314, it is to be understood that such connections represent any number of signal paths. For instance, in an embodiment where the regulator circuits 312, 314 have two switches each (see for example, FIG. 2), the controller 350 has two connecting paths to the two switches in each regulator circuit 312, 314. Alternatively, a single connection can carry multiple signals, and those signals can be distributed to multiple switches when the signals reach the regulator circuits 312, 314. For instance, a single connection can carry multiplexed signals. A demultiplexer can split the two signals from the multiplexed signal and the split signals could be communicated to their respective switches. The demultiplexing can take place within the regulator circuits 312, 314, or external to the regulator circuits 312, 314.

In an embodiment (not illustrated), a separate local controller can be provided for each regulator circuit 312, 314. The central controller can control these local controllers. Either the local controllers or the central controller can monitor voltages across sets of batteries. Additionally, either the local controllers communicating between themselves or the central controller can identify voltage imbalances across sets of batteries. Similarly, either the local controllers communicating between themselves or the central controller can instruct the regulator circuits to balance the voltages across sets of batteries having imbalanced voltages.

We now move to a discussion of the number of regulator circuits in an energy storage system. When there are more than two batteries in an energy storage system, different numbers of regulator circuits can be used to balance the same number of batteries. For example, a four-battery energy storage system can be balanced using two regulator circuits or three regulator circuits. However, some designs are more efficient than others. In particular, energy storage systems having $2^n$ (e.g., 2, 4, 8, 16, 32, 64, etc.) batteries can be very efficient since only $2^n/2$ regulator circuits are needed where $2^n$ is the number of batteries, and n is any positive integer. While most energy storage systems having a number of batteries not equal to $2^n$ may have more than $2^n/2$ regulator circuits, energy storage systems having $2^n$ batteries may be designed with as few as $2^n/2$ regulator circuits. In other words, energy storage systems having a number of batteries equal to $2^n$ can be implemented with a number of regulator circuits equal to half the number of batteries.

Figure 4:
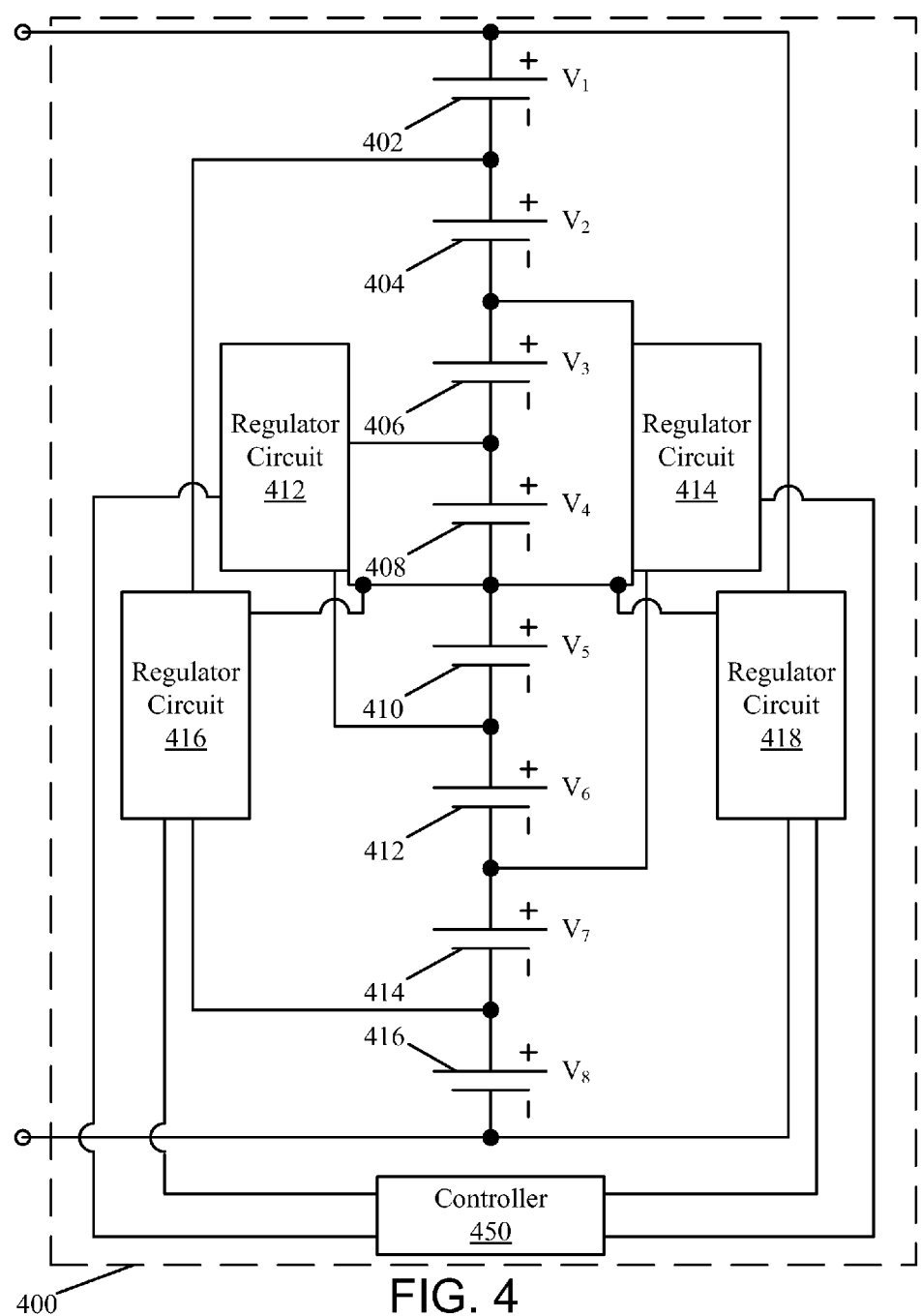
FIG. 4 illustrates an embodiment of an energy storage system having eight batteries and four regulator circuits.

FIGS. 3 and 4 illustrate two designs having a number of batteries equal to $2^n$. While the four batteries in FIG. 3 are balanced by two regulator circuits, in FIG. 4, eight batteries are balanced by four regulator circuits.

FIG. 4 illustrates an embodiment of an energy storage system having eight batteries and four regulator circuits. The energy storage system 400 includes eight batteries 402, 404, 406, 408, 410, 412, 414, 416. The batteries 402, 404, 406, 408, 410, 412, 414, 416 are connected in series. The energy storage system 400 is series connected to a charger/load (not illustrated, but note the two open connections on the left side of the figure which illustrate where a charger or load can be connected). The energy storage system 400 includes four regulator circuits 412, 414, 416, 418. In an embodiment, the regulator circuits 412, 414, 416, 418 comprise the capacitive circuits, the inductive circuit, and the switches illustrated in FIG. 2. Each regulator circuit 412, 414, 416, 418 is configured to balance the voltages across two sets of batteries as described below.

In the illustrated embodiment, the first regulator circuit 412 is configured to balance the voltages across the following two sets of batteries: (1) fourth battery 408; and (2) fifth battery 410. The second regulator circuit 414 is configured to balance the voltages across the following two sets of batteries: (1) third battery 406, and fourth battery 408; and (2) fifth battery 410, and sixth battery 412. The third regulator circuit 416 is configured to balance the voltages across the following two sets of batteries: (1) second battery 404, third battery 406, and fourth battery 408; and (2) fifth battery 410, sixth battery 412, and seventh battery 414. The fourth regulator circuit 418 is configured to balance the voltages across the following two sets of batteries: (1) first battery 402, second battery 404, third battery 406, and fourth battery 408; and (2) fifth battery 410, sixth battery 412, seventh battery 414, and eighth battery 416.

The energy storage system 400 may include a controller 450 configured to control the regulator circuits 412, 414, 416, 418. Although FIG. 4 only shows a single connection between the controller and each of the regulator circuits 412, 414, 416, 418, it is to be understood that such connections may represent any number of signal paths (including multiplexed signals).

Two examples of $2^n$-sized energy storage systems have been seen. Both balanced the voltages across all sets of batteries using a number of regulator circuits equal to half the number of batteries. In comparison, a non-$2^n$-sized energy storage system may have more regulator circuits per cell. For example, an energy storage system having five batteries may be implemented with four regulator circuits.

Figure 5:
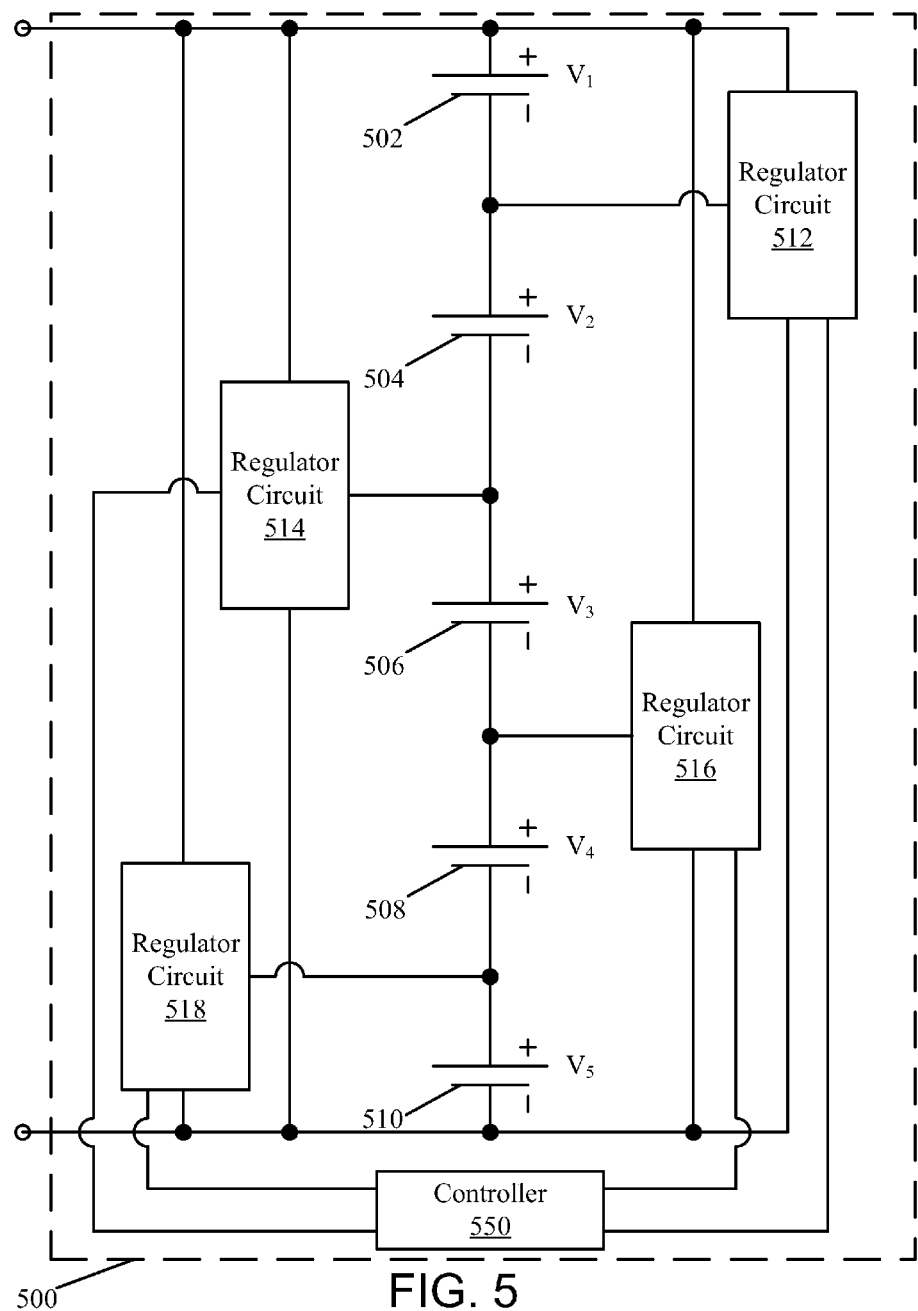
FIG. 5 illustrates an embodiment of an energy storage system having five batteries and four regulator circuits.

FIG. 5 illustrates an embodiment of an energy storage system having five batteries and four regulator circuits. The energy storage system 500 includes five batteries 502, 504, 506, 508, 510. The batteries 502, 504, 506, 508, 510 are connected in series. The energy storage system 500 is series connected to a charger/load (not illustrated, but note the two open connections on the left side of the figure which illustrate where a charger or load can be connected). The energy storage system 500 includes four regulator circuits 512, 514, 516, 518. In an embodiment, the regulator circuits 512, 514, 516, 518 comprise the capacitive circuits (optional), the inductive circuit, and the switches illustrated in FIG. 2. Each regulator circuit 512, 514, 516, 518 is configured to balance the voltages across two sets of batteries as described below.

The first regulator circuit 512 is configured to balance the voltages across the following two sets of batteries: (1) first battery 502; and (2) second battery 504, third battery 506, fourth battery 508, and fifth battery 510. The second regulator circuit 514 is configured to balance the voltages across the following two sets of batteries: (1) first battery 502, and second battery 504; and (2) third battery 506, fourth battery 508, and fifth battery 510. The third regulator circuit 516 is configured to balance the voltages across the following two sets of batteries: (1) first battery 502, second battery 504, and third battery 506; and (2) fourth battery 508, and fifth battery 510. The fourth regulator circuit 518 is configured to balance the voltages across the following two sets of batteries: (1) first battery 502, second battery 504, third battery 506, and fourth battery 508; and (2) fifth battery 510.

The energy storage system 500 may include a controller 550 configured to control the regulator circuits 512, 514, 516, 518. Although FIG. 5 only shows a single connection between the controller and each of the regulator circuits 512, 514, 516, 518, it is to be understood that such connections may represent any number of signal paths (including multiplexed signals).

In an embodiment where switches are used in the regulator circuits 512, 514, 516, 518 special note must be made regarding the default duty cycle. In energy storage systems having sets of batteries consisting of the same number of batteries (see for example, FIGS. 1-3), the duty cycle when batteries are balanced may be 50%. However, in embodiments such as illustrated in FIG. 5, where the numbers of batteries in the sets of batteries are not equal, the duty cycle when batteries are balanced (the default duty cycle) may not equal to 50%. For instance, the default duty cycles for the energy storage system 500 may be as follows: first regulator circuit 512 has a default duty cycle of 80%; (2) second regulator circuit 514 has a default duty cycle of 60%; (3) third regulator circuit 516 has a default duty cycle of 40%; and (4) fourth regulator circuit 518 has a default duty cycle of 20%. The non-default duty cycle will differ from these values, as the system attempts to balance voltage imbalances between sets of batteries. For instance, the second regulator circuit 514 may be adjusted from the default duty cycle of 60% to another value (e.g., 59%) when the batteries that it regulates are not balanced.

The point of comparing the number of regulator circuits illustrated in FIGS. 3-5 is not to show that non-$2^n$-sized energy storage systems are not useful, but rather simply to show that $2^n$-sizes energy storage systems may be preferred due to the lower number of regulator circuits per battery in $2^n$-sized systems.

Figure 6:
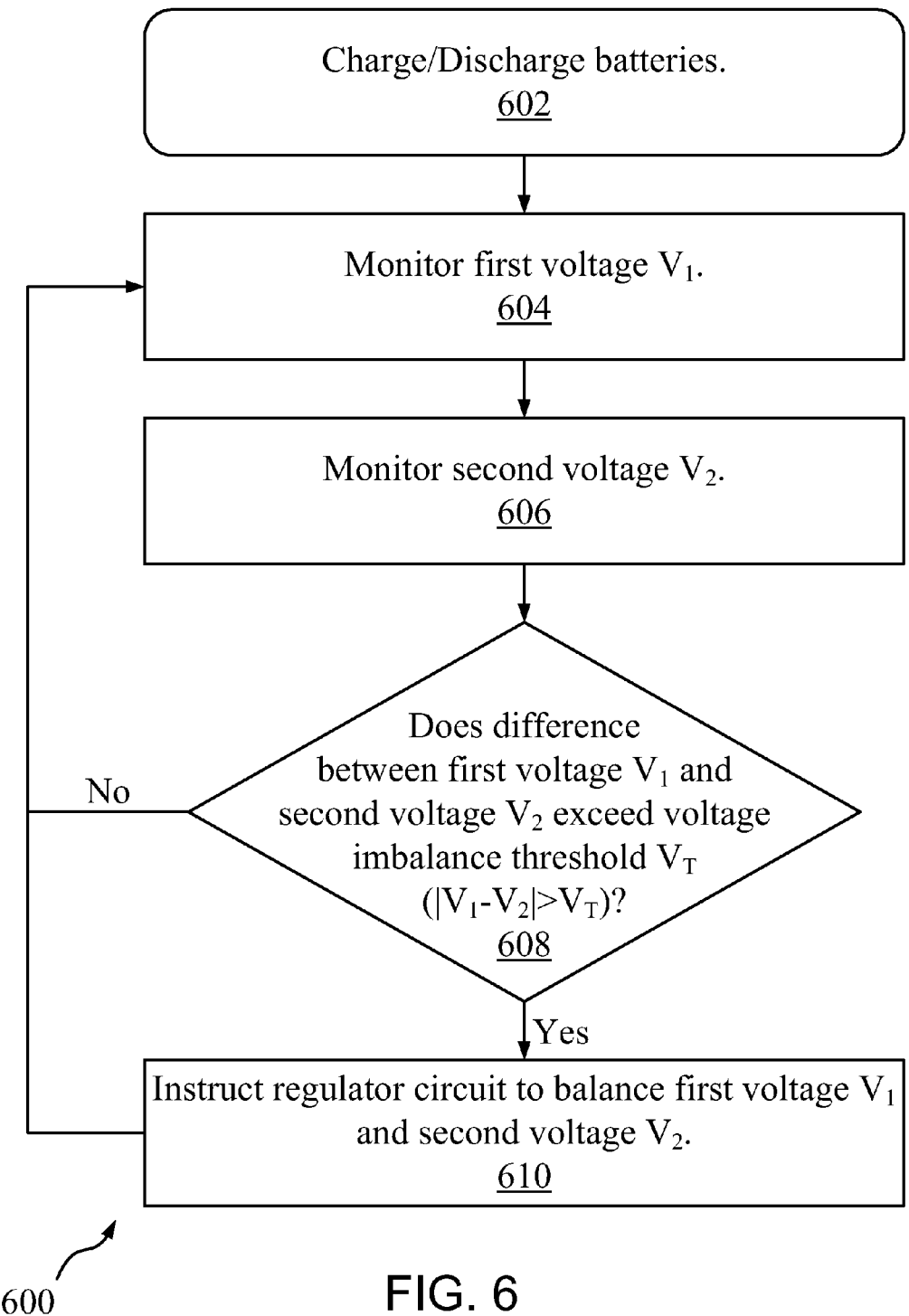
FIG. 6 illustrates a first embodiment of a method of operating the herein disclosed energy storage system.

FIG. 6 illustrates a first embodiment of a method of operating the herein disclosed energy storage system. The method 600 may include a charging or discharging a battery operation 602. The battery being charged or discharged can comprise two or more batteries connected in series.

While the battery is being charged or discharged, a first voltage $V_1$ across a first set of batteries and a second voltage $V_2$ across a second set of batteries can be monitored. As such, the method 600 may include a monitor first voltage $V_1$ operation 604. The method 600 may also include a monitor second voltage $V_2$ operation 606.

Once the first and second voltages $V_1$, $V_2$ have been monitored (observed or measured), the difference ($|V_1-V_2|$) between the first and second voltages $V_1$, $V_2$ can be determined. This difference can be compared to the voltage imbalance threshold $V_T$ to determine if the voltage difference exceeds the threshold ($|V_1-V_2|>V_T$) in a difference determination 608. If the difference is equal to or less than the threshold, then the method 600 may loop back to the monitor operations 604, 606. If the difference is greater than the threshold, then the controller may instruct the regulator circuit associated with the voltage imbalance to balance the first voltage $V_1$ and the second voltage $V_2$. The regulator circuit can balance the first and second voltages by storing bypass energy in an energy storage unit, and distributing this stored bypass energy to one of the sets of batteries.

Simultaneously or sometime thereafter, the method 600 may loop back to the monitor operations 604, 606.

Figure 7:
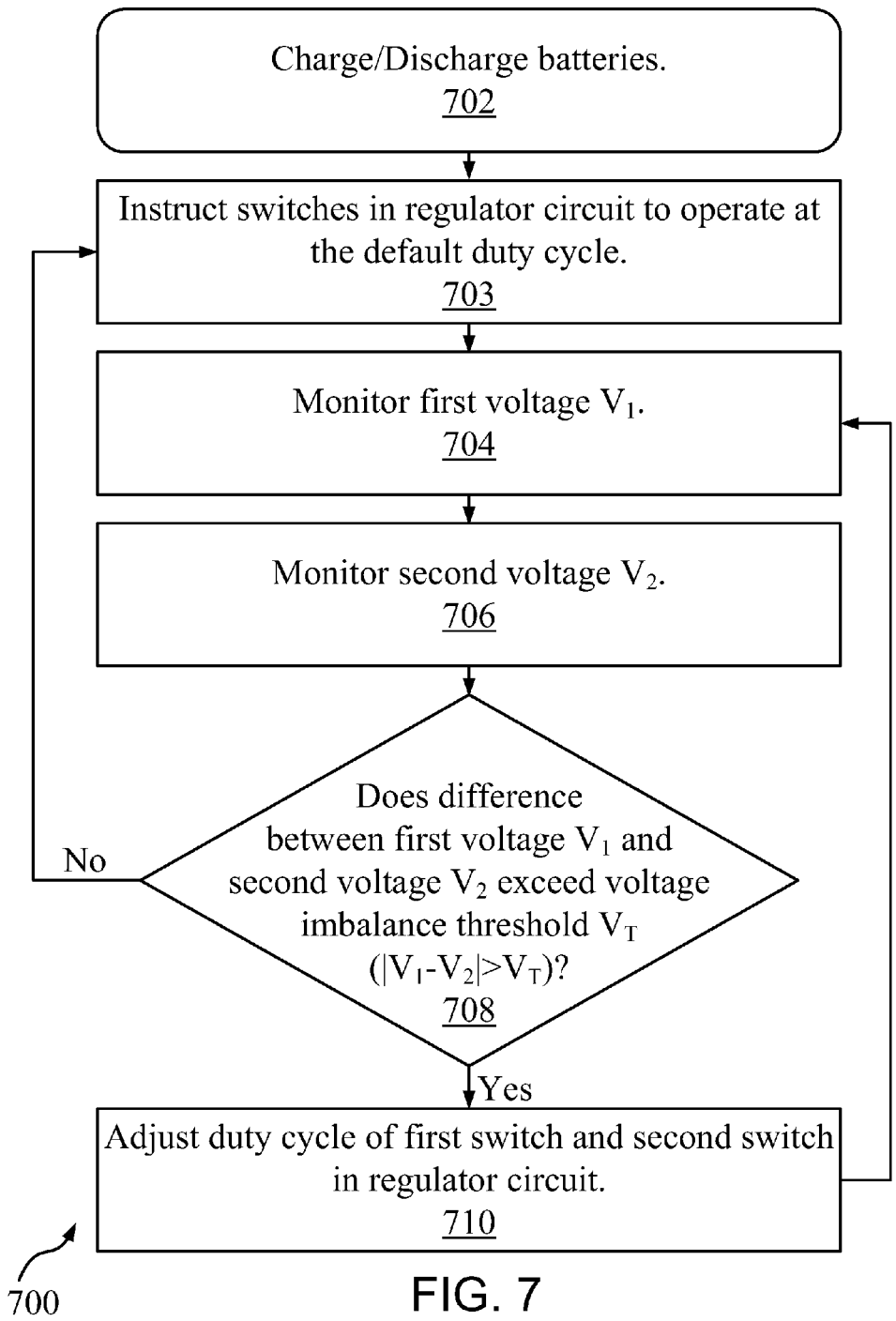
FIG. 7 illustrates a second embodiment of a method of operating the herein disclosed energy storage system.

FIG. 7 illustrates a second embodiment of a method of operating the herein disclosed energy storage system. The method 700 is similar to the method 600 with two differences. First, since the method 700 assumes that the regulator circuits comprise switches, the method 700 also accounts for duty cycle instructions. Thus, in the method 700, instructions may be initially provided to the switches in the one or more regulator circuits to operate at the default duty cycle (instruct operation 703). For energy storage systems where the number of batteries in each set of batteries is equal, the default duty cycle may be 50%. For energy storage systems where the numbers of batteries in each set of batteries is not equal, the default duty cycle may be greater or less than 50%. The exact default duty cycle may depend on the configuration of regulator circuits.

Second, if the difference in voltage determination 708 determines that the magnitude of the difference between the voltages $|V_1-V_2|$ across two sets of batteries is less than the voltage imbalance threshold $V_T$, then the method 700 may loop back to the instruct operation 703. In other words, if no voltage imbalance is monitored, then the method 700 may continue to instruct the switches to operate at the default duty cycle. If the voltage imbalance $|V_1-V_2|$ is greater than the voltage imbalance threshold $V_T$, then the method 700 may adjust the duty cycle of the first switch and the second switch in the regulator circuit via the adjust operation 710. This adjustment allows energy to bypass one set of batteries, be stored in one or more energy storage units, and later be distributed to the other set of batteries. Once the duty cycle has been adjusted, the method 700 may loop back to the monitor operation 704. The monitor operations 704, 706, the difference determination 708, and the adjust operation 710 may continue to loop until the difference between voltages falls below the voltage threshold $V_T$. At that point, the duty cycle may return to the default and remain there until a voltage imbalance greater than the voltage imbalance threshold is determined.

It is clear that many modifications and variations of this embodiment may be made by one skilled in the art without departing from the spirit of the novel art of this disclosure. These modifications and variations do not depart from the broader spirit and scope of the invention, and the examples cited here are to be regarded in an illustrative rather than a restrictive sense.

In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure. For example, low-loss capacitors can be used in the capacitive circuits. Also, the controller may use isolated or floating connections to the switches of the regulator circuits in order to prevent damage from voltage/current spikes.

Numerous other changes may be made that will readily suggest themselves to those skilled in the art and which are encompassed in the spirit of the invention disclosed and as defined in the appended claims.

What is claimed is:

1. An energy storage system comprising:
 a plurality of batteries connected in series;
 a first regulator circuit configured to balance voltages across two first battery sets of the plurality of batteries, the first regulator circuit comprising at least one switchable connection and at least one energy storage unit, wherein the at least one switchable connection connects the at least one energy storage unit to the two first battery sets;
 a second regulator circuit configured to balance voltages across two second battery sets of the plurality of batteries, wherein each set in the two first battery sets includes one set from the two second battery sets; and
 a controller connected to the first regulator circuit and the second regulator circuit and configured to:
  monitor voltages across the two first battery sets and voltages across the two second battery sets;
  identify voltage imbalances between the two first battery sets and voltage imbalances between the two second battery sets; and
  adjust the first regulator circuit and the second regulator circuit to minimize the voltage imbalances between the two first battery sets and the voltage imbalances between the two second battery sets.

2. The energy storage system of claim 1, wherein the at least one switchable connection comprises one or more transistors.

3. The energy storage system of claim 1, wherein the at least one energy storage unit comprises one or more inductive circuits.

4. The energy storage system of claim 1, wherein the at least one energy storage unit comprises one or more capacitive circuits.

5. The energy storage system of claim 1, wherein the second regulator circuit comprises:
 two capacitive circuits each connected in parallel with one of the two second battery sets;
 an inductive circuit connected to:
  the two capacitive circuits; and
  the two second battery sets;
 two switches each connected to:
  the inductive circuit;
  one of the two capacitive circuits;
  one of the two second battery sets; and
  the controller.

6. The energy storage system of claim 5, wherein the two switches operate at a fifty percent duty cycle when the voltages across the two second battery sets are equal.

7. The energy storage system of claim 5, wherein the two switches operate at a duty cycle not equal to fifty percent when the voltages across the two second battery sets are not equal, and wherein the duty cycle is such that the voltages across the two sets of batteries converge.

8. The energy storage system of claim 5, wherein the two switches are transistors.

9. The energy storage system of claim 1, wherein the plurality of batteries comprises $2^n$ number of batteries, where n is a positive integer; and the energy storage system comprises only $2^n/2$ number of regulator circuits to balance the $2^n$ number of batteries between each other.

10. The energy storage system of claim 1, wherein the first regulator circuit is turned off when the voltages across the first two battery sets are balanced.

11. The energy storage system of claim 1, wherein the controller is further configured to:
 monitor the direction of current through the batteries; and
 determine whether the batteries are being charged or discharged.

12. A method comprising:
 monitoring voltages across two first battery sets;
 monitoring voltage across two second battery sets, wherein each set in the two first battery sets includes one set from the two second battery sets;

determining if a difference between the voltages across the two first battery sets exceeds a voltage imbalance threshold;

instructing a first regulator circuit, associated with the two first battery sets, to balance the voltages across the two first battery sets, by:
  storing bypass energy in an energy storage unit; and
  distributing the stored bypass energy to at least one of the first set of batteries and the second set of batteries;

determining if a difference between the voltage across the two second battery sets exceeds the voltage imbalance threshold; and instructing a second regulator circuit, associated with the two second battery sets, to balance the voltages across the two second battery sets.

13. The method of claim 12, wherein the instructing further comprises adjusting a duty cycle of two switches in the first regulator circuit.

14. An energy storage system comprising:
a plurality of batteries connected in series;
a first regulator circuit coupled to two first sets of batteries in the plurality of batteries and configured to balance voltages of the two first sets, and wherein the first regulator circuit comprises:
  an inductive circuit;
  a first switch; and
  a second switch;
a second regulator circuit coupled to two second sets of batteries in the plurality of batteries and configured to balance voltages of the two second sets, wherein each set in the first sets includes one set from the second sets; and
a controller connected to the first regulator circuit and the second regulator circuit and configured to at least:
  adjust the first switch and the second switch to minimize imbalance between the voltages of the two first sets; and
  minimize imbalance between the voltages of the two second sets.

15. The energy storage system as recited in claim 14, wherein the first regulator circuit further comprises:

a first capacitive circuit; and
a second capacitive circuit.

16. The energy storage system as recited in claim 15, wherein:
  the first capacitive circuit is connected in parallel with a first one of the two first sets of batteries;
  the second capacitive circuit is connected parallel to a second one of the two first sets of batteries
  the first switch is connected to the second switch in series;
  the first switch and the second switch are connected parallel to the two first sets of batteries;
  the inductor is connected between a connection point between the first capacitive circuit and the second capacitive circuit and a connection point between the first switch and the second switch; and
  the controller is connected to control the first switch and the second switch.

17. The energy storage system as recited in claim 15, wherein:
  the first capacitive circuit is in parallel with a first one of the two first sets of batteries; and
  the second capacitive circuit is in parallel with a second one of the two first sets of batteries.

18. The energy storage system as recited in claim 15, wherein the inductive circuit comprises a second terminal connected to:
  a second terminal of the first capacitive circuit; and
  a first terminal of the second capacitive circuit.

19. The energy storage system as recited in claim 14, wherein the controller is configured to:
  identify a voltage imbalance when a difference between the voltages of the two first sets exceeds a voltage imbalance threshold; and
  adjust a duty cycle of the first switch and the second switch to decrease the difference.

20. The energy storage system as recited in claim 14, wherein the controller is connected to the two first sets of batteries.

* * * * *